(12) United States Patent
Sugden

(10) Patent No.: US 12,123,206 B2
(45) Date of Patent: Oct. 22, 2024

(54) ANCHOR BOLT MOUNTING

(71) Applicant: Michael D. Sugden, Yakima, WA (US)

(72) Inventor: Michael D. Sugden, Yakima, WA (US)

(73) Assignee: Michael D. Sugden, Yakima, WA (US)

( * ) Notice: Subject to any disclaimer, the term of this patent is extended or adjusted under 35 U.S.C. 154(b) by 310 days.

(21) Appl. No.: 17/786,376

(22) PCT Filed: Jun. 2, 2020

(86) PCT No.: PCT/US2020/035746
§ 371 (c)(1),
(2) Date: Jun. 16, 2022

(87) PCT Pub. No.: WO2021/126305
PCT Pub. Date: Jun. 24, 2021

(65) Prior Publication Data
US 2023/0011074 A1    Jan. 12, 2023

Related U.S. Application Data

(60) Provisional application No. 62/950,059, filed on Dec. 18, 2019.

(51) Int. Cl.
*E04G 21/12* (2006.01)
*B28B 23/00* (2006.01)
(Continued)

(52) U.S. Cl.
CPC .......... *E04G 21/12* (2013.01); *B28B 23/005* (2013.01); *B28B 23/0056* (2013.01);
(Continued)

(58) Field of Classification Search
CPC ..... E04G 21/12; E04G 21/185; E04B 1/4157; B28B 23/005; B28B 23/0056
See application file for complete search history.

(56) References Cited

U.S. PATENT DOCUMENTS

| | | | |
|---|---|---|---|
| 4,693,656 A | 9/1987 | Guthrie | |
| 5,836,132 A * | 11/1998 | Weathersby | .......... E04G 21/185 249/207 |

(Continued)

FOREIGN PATENT DOCUMENTS

| | | | |
|---|---|---|---|
| CN | 204199318 U | | 3/2015 |
| CN | 204225145 U | * | 3/2015 |

(Continued)

OTHER PUBLICATIONS

International Search Report and Written Opinion, mailed Aug. 10, 2020, for International Patent Application No. PCT/US2020/035746. (7 pages).

*Primary Examiner* — Atul P. Khare
(74) *Attorney, Agent, or Firm* — Seed IP Law Group LLP

(57) ABSTRACT

A system for mounting an anchor bolt to formwork or other structures associated with concrete construction includes a main body and latch coupled to the main body. The anchor bolt can pass through the main body and the latch can be moved so that threads formed in the latch engage threads formed in the anchor bolt to secure the anchor bolt in position as concrete is poured around the anchor bolt. The main body and the latch can have through holes for receiving a nail to lock the position of the latch with respect to the main body.

20 Claims, 10 Drawing Sheets

(51) Int. Cl.
  *B29C 39/00* (2006.01)
  *B29C 70/68* (2006.01)
  *B29C 70/72* (2006.01)
  *B29C 70/78* (2006.01)
  *E04B 1/41* (2006.01)
  *E04G 21/18* (2006.01)

(52) U.S. Cl.
  CPC .......... *B29C 39/003* (2013.01); *B29C 70/682* (2013.01); *B29C 70/72* (2013.01); *B29C 70/78* (2013.01); *E04B 1/4157* (2013.01); *E04G 21/185* (2013.01)

(56) References Cited

U.S. PATENT DOCUMENTS

| | | | |
|---|---|---|---|
| 6,065,730 A | 5/2000 | Marks | |
| 7,984,541 B1 * | 7/2011 | Davidson | B25B 23/00 33/645 |
| 9,556,627 B2 | 1/2017 | Weaver | |

FOREIGN PATENT DOCUMENTS

| | | | | |
|---|---|---|---|---|
| CN | 212897686 U | * | 4/2021 | |
| CN | 113202131 A | * | 8/2021 | ............. E02D 15/02 |
| JP | H09302675 A | | 11/1997 | |
| JP | 2003184102 A | * | 7/2003 | |
| JP | 4494839 B2 | | 6/2010 | |
| WO | WO-9525209 A1 | * | 9/1995 | ........... B28B 23/005 |

* cited by examiner

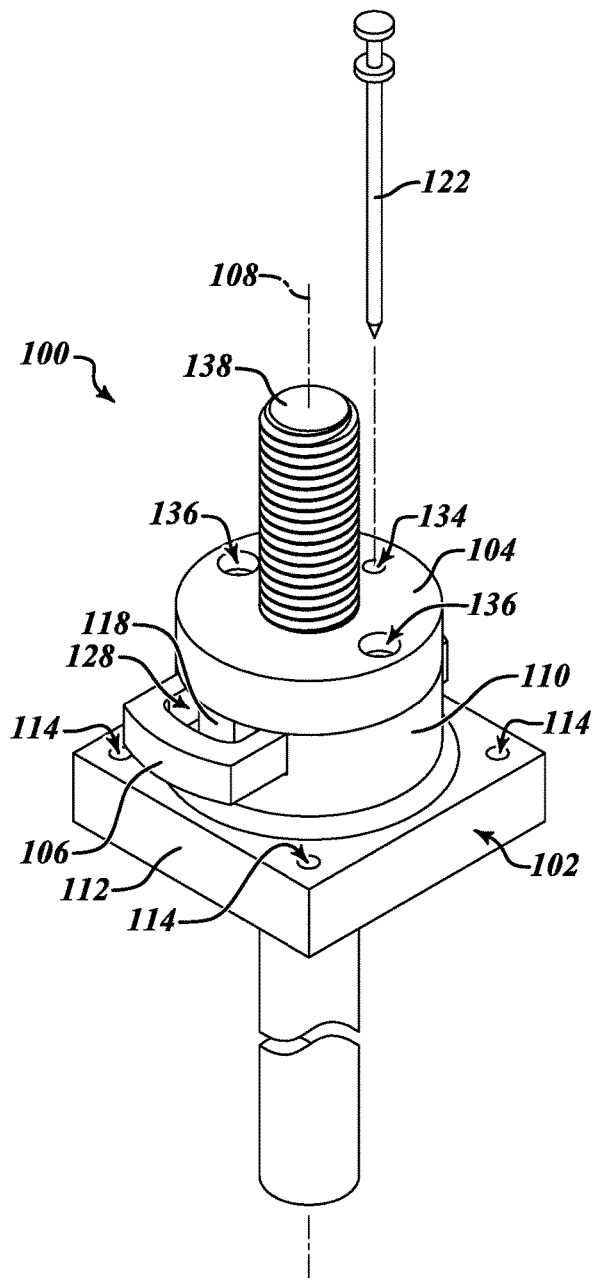 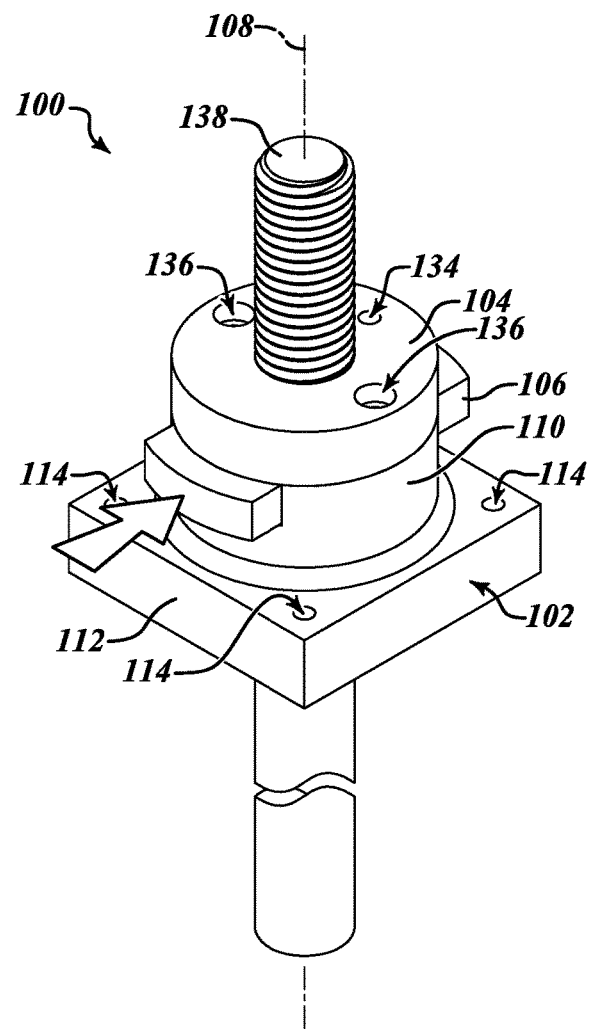
*FIG.8*  *FIG.9*

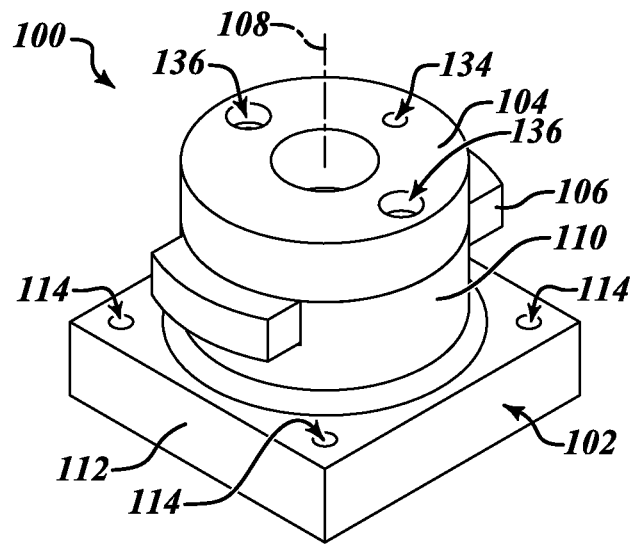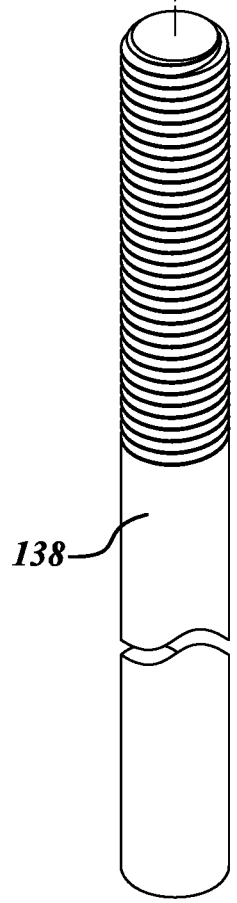
FIG.10

ANCHOR BOLT MOUNTING

BACKGROUND

Technical Field

The present disclosure relates generally to anchor bolts configured to be partially embedded in concrete, and more particularly to systems for mounting such anchor bolts, such as to concrete formwork, such that the anchor bolts are held in place as concrete is poured and cured around the anchor bolts.

Description of the Related Art

Concrete structures are ubiquitous in modern society. Many concrete structures, including those forming components of large infrastructure projects, have other components, systems, or structures coupled to them. For example, a bridge may have lampposts, highway signage, power lines, handrails, guardrails, and other components coupled thereto. As another example, one concrete structure, such as a bridge deck, may be coupled to other steel or concrete structures, such as columns, walls or other components of the overall system.

Anchor bolts may be embedded partially within a body of concrete, with a first portion of the anchor bolt inside of and affixed to the solid concrete body and a second portion of the anchor bolt extending outside of and away from the solid concrete body. The second portion of such an anchor bolt may be threaded and can be used to affix other components to the solid concrete body in a relatively straightforward manner.

Anchor bolts may be cast-in-place within the concrete body, and may take the form of a threaded rod such as a straight bolt or a J-bolt. In such embodiments, the embedded end of the anchor bolt may include structures configured to more securely couple the anchor bolt to the body of concrete, such as a hexagonal head, washer, bend, flange, or other laterally-extending component. Anchor bolts may also be installed after a body of concrete has been poured and cured, and may take the form of an expansion bolt such as an expansion anchor bolt commercially available under the brand name HILTI.

In cases where anchor bolts are cast-in-place, the anchor bolts are typically coupled to plate or "templates," which may in turn be coupled to formwork or a rebar cage for the concrete being poured, to secure the anchor bolts in place as the concrete is poured and cures around them. Such templates are often sacrificial, in that they are also cast into the poured concrete and not recoverable for re-use.

BRIEF SUMMARY

In some embodiments, a system for mounting an anchor bolt may be summarized as comprising: a main body including an open space that extends through the main body, wherein the open space has a central longitudinal axis and is configured to receive the anchor bolt, wherein the main body includes a slot that extends through the main body in a direction transverse to the axis; and a latch positioned within the slot, wherein the latch has a wall that is curved with a radius of curvature corresponding to a radius of the anchor bolt and that has first threads with first thread dimensions corresponding to second thread dimensions of second threads of the anchor bolt, wherein the latch can translate through the slot between a closed position and an open position, wherein when the anchor bolt extends through the open space and the latch is translated through the slot to the closed position, the first threads of the latch engage the second threads of the anchor bolt to prevent translation of the anchor bolt along the axis with respect to the main body and when the anchor bolt extends through the open space and the latch is translated through the slot to the open position, the first threads of the latch do not engage the second threads of the anchor bolt.

The main body may include a flange that extends radially outward with respect to the axis. The main body may include a plurality of through holes that each extend through the flange and parallel to the axis. The slot may extend perpendicular to the axis. The main body may have a first through hole that extends through the main body and the latch may have a second through hole that extends through the latch, wherein the first through hole is aligned with the second through hole when the latch is in the closed position. The first and second through holes may be configured to receive a 16 penny nail. The slot may be a first slot, the main body may include a ridge that extends through the first slot, the latch may include a second slot, and the ridge may extend through the second slot. The ridge may limit travel of the latch through the first slot. The first threads may be formed in the second slot. The main body may include a base and a cap, wherein the cap can be fastened to the base to lock the latch to the main body and the cap can be unfastened from the base to unlock the latch from the main body. The latch may include a first portion and a second portion, wherein the first portion can be fastened to the second portion to lock the latch to the main body and the first portion can be unfastened from the second portion to unlock the latch from the main body.

A method may be summarized as comprising: securing a template to concrete formwork; securing a mounting system to the template, wherein the mounting system includes a main body and a latch, the main body having an open space and a slot extending through the main body; translating an anchor bolt through the open space extending through the main body; and translating the latch through the slot extending through the main body until a first curved, threaded wall of the latch engages a second curved, threaded wall of the anchor bolt such that the latch prevents translation of the anchor bolt through the open space. The method may further comprise: pouring concrete around a portion of the anchor bolt and allowing the concrete to cure; translating the latch through the slot extending through the main body until the first curved, threaded wall of the latch does not engage the second curved, threaded wall of the anchor bolt; and translating the template and the mounting system with respect to the anchor bolt until the anchor bolt does not extend through the open space extending through the main body.

The mounting system may be a first mounting system, the main body may be a first main body, the latch may be a first latch, the open space may be a first open space, the slot may be a first slot, and the method may further comprise: securing a second mounting system to the template, wherein the second mounting system includes a second main body and a second latch, the second main body having a second open space and a second slot extending through the second main body; securing a third mounting system to the template, wherein the third mounting system includes a third main body and a third latch, the third main body having a third open space and a third slot extending through the third main body; and securing a fourth mounting system to the template, wherein the fourth mounting system includes a fourth main body and a fourth latch, the fourth main body having a fourth open space and a fourth slot extending through the fourth main body.

Securing the template to the concrete formwork may occur before or after securing the mounting system to the template. Securing the template to the concrete formwork may occur before or after translating the anchor bolt through the open space and the latch through the slot. Securing the mounting system to the template may occur before or after translating the anchor bolt through the open space and the latch through the slot.

BRIEF DESCRIPTION OF THE SEVERAL VIEWS OF THE DRAWINGS

FIG. 8 is a perspective view of the system for mounting an anchor bolt illustrated in FIG. 1, with an anchor bolt coupled to the system.

FIG. 9 is another perspective view of the system for mounting an anchor bolt illustrated in FIG. 1, with the anchor bolt released from the system.

FIG. 10 is another perspective view of the system for mounting an anchor bolt illustrated in FIG. 1, with the anchor bolt removed from the system.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
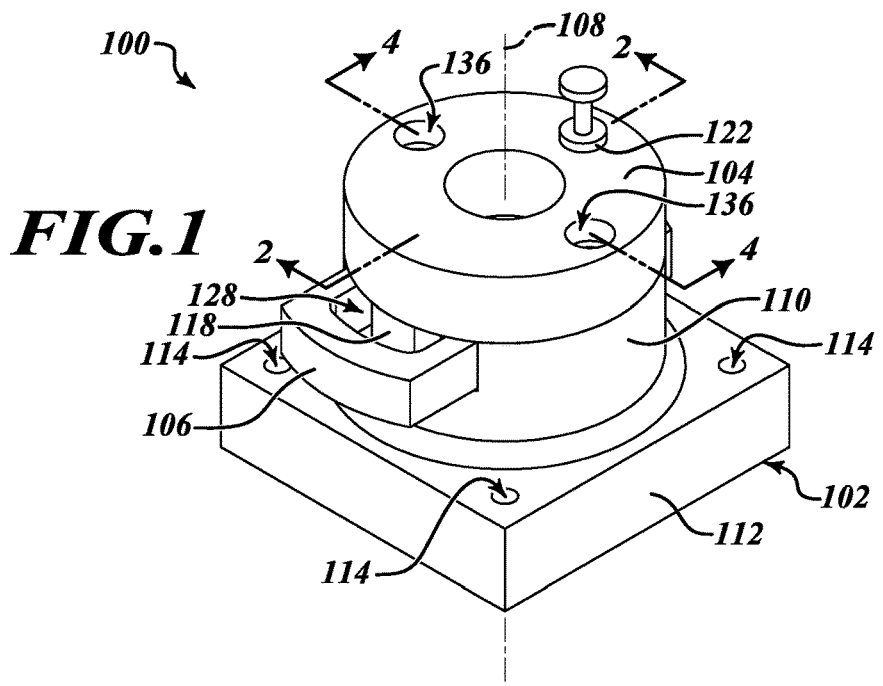
FIG. 1 is a perspective view of a system for mounting an anchor bolt.

FIG. 1 illustrates a system 100 for mounting or securing an anchor bolt in place as concrete is poured around the anchor bolt and allowed to cure. In some embodiments, the system 100 may be coupled to a plate or "template," which may in turn be coupled to formwork or a rebar cage for the concrete being poured, as described further elsewhere herein. As illustrated in FIG. 1, the system 100 includes a main body, which may be made up of a foundation or first portion 102, which may be referred to herein as a "base" 102, and a cover, lid, or second portion 104, which may be referred to herein as a "cap" 104, and may be coupled to the base 102, and a tab or a slider, which may be referred to herein as a "catch" or a "latch" 106 that can slide or move laterally with respect to the base 102 and the cap 104.

Figure 2:
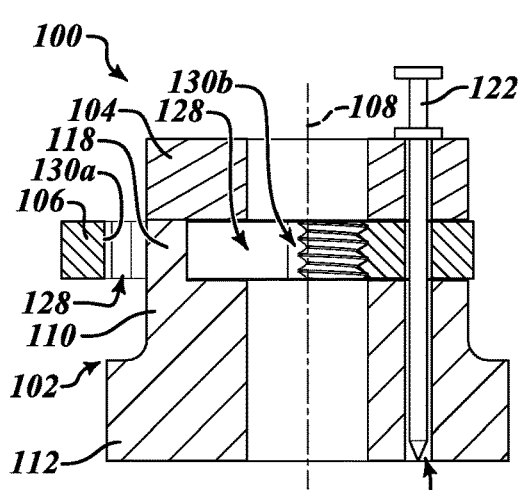
FIG. 2 is a cross-sectional view of the system for mounting an anchor bolt illustrated in FIG. 1, taken along line 2-2 shown in FIG. 1.
Figure 3:
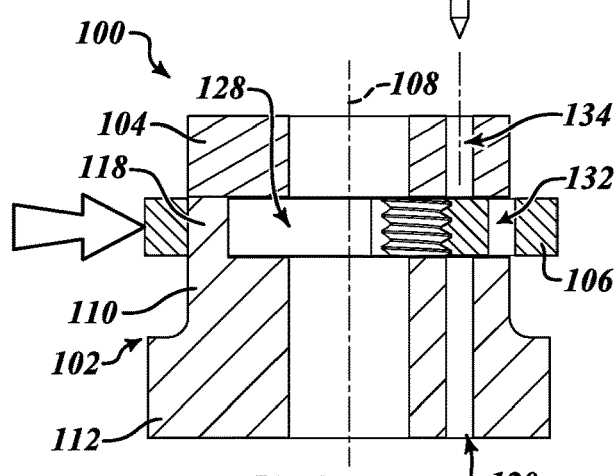
FIG. 3 is another cross-sectional view of the system for mounting an anchor bolt illustrated in FIG. 1.
Figure 4:
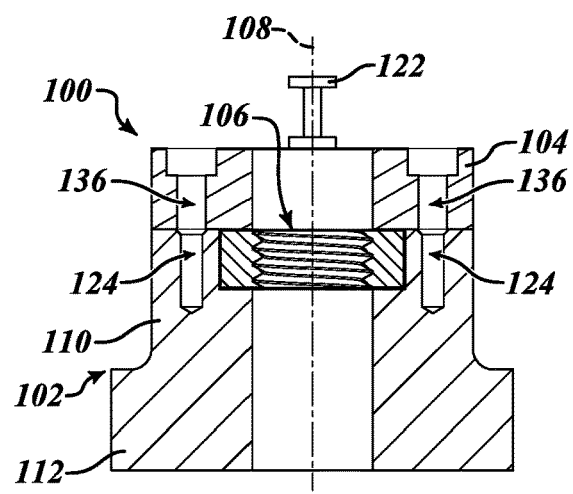
FIG. 4 is a cross-sectional view of the system for mounting an anchor bolt illustrated in FIG. 1, taken along line 4-4 shown in FIG. 1.
Figure 5:
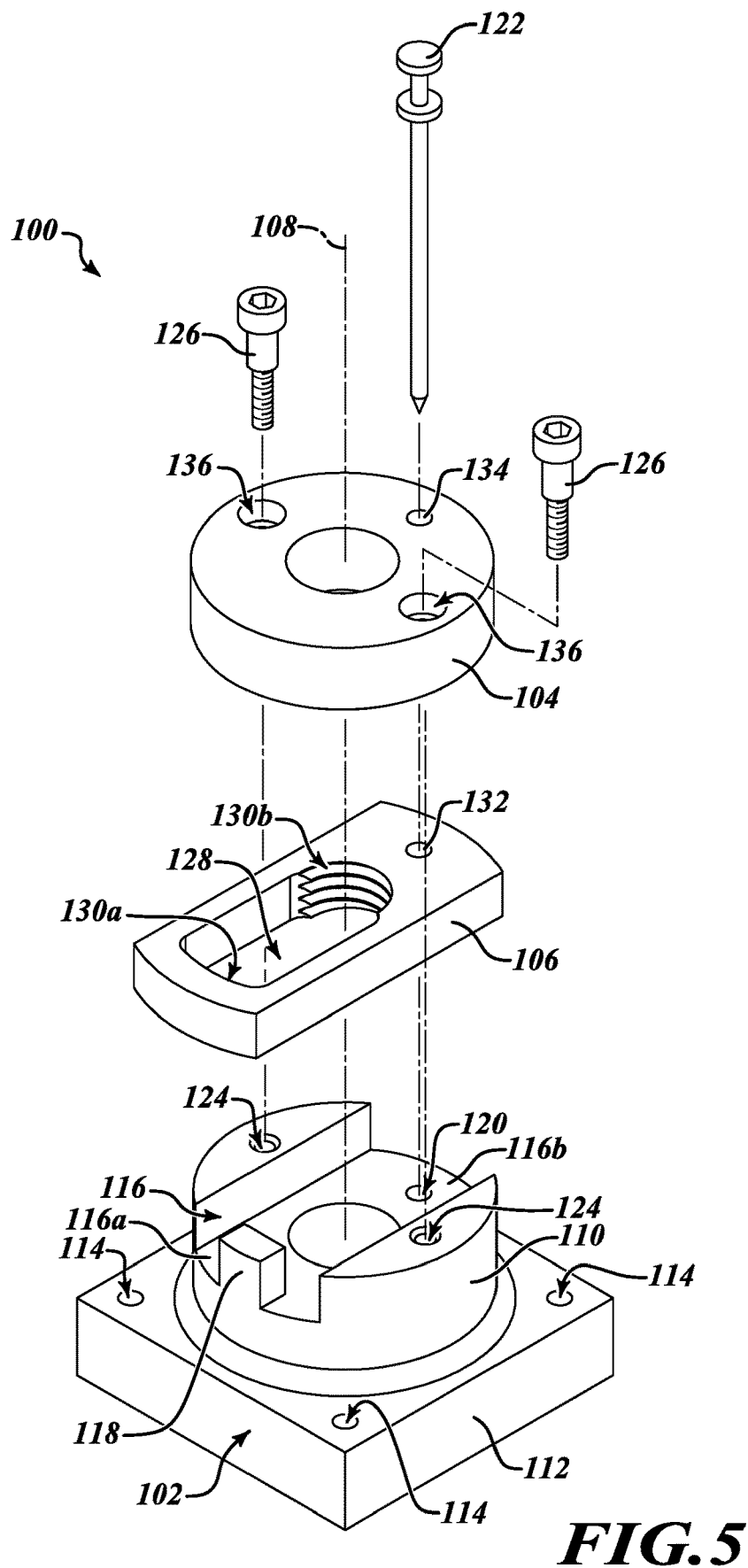
FIG. 5 is an exploded view of the system for mounting an anchor bolt illustrated in FIG. 1.

FIG. 2 illustrates a cross-sectional view of the system 100 taken along line 2-2 illustrated in FIG. 1, with the latch 106 in a first position with respect to the base 102 and the cap 104 of the main body. FIG. 3 illustrates another cross-sectional view of the system 100 similar to the cross-sectional view of FIG. 2 but with the latch 106 moved laterally from the first position illustrated in FIG. 2 to a second position with respect to the base 102 and the cap 104 of the main body. FIG. 4 illustrates a cross-sectional view of the system 100 taken along line 4-4 illustrated in FIG. 1. FIG. 5 illustrates an exploded view of the system 100.

As illustrated in FIGS. 1-5, the system 100 has a central longitudinal axis 108 that extends through a center of the system 100 and that defines a central axis of some circular and/or cylindrical components and features of the system 100. As also illustrated in FIGS. 1-5, the base 102 of the main body of the system 100 includes a cylindrical body 110 at a first end thereof along the axis 108 and a flange 112 at a second end thereof along the axis 108 opposite to the first end thereof, wherein the flange 112 is directly coupled to, or integrally or monolithically formed with, the cylindrical body 110, such that the flange 112 and the cylindrical body 110 cannot be disconnected from one another without breaking the base 102. As further illustrated in FIGS. 1-5, the cylindrical body 110 is hollow and surrounds a cylindrical open space having a central longitudinal axis coincident with the axis 108, and has an outer cylindrical surface having a central longitudinal axis coincident with the axis 108.

The flange 112 is also hollow and also surrounds a cylindrical open space having a central longitudinal axis coincident with the axis 108. An inner surface of the cylindrical body 110 is flush with an inner surface of the flange 112, such that these inner surfaces form a single cylindrical surface that extends along the entire length of the base 102 in the direction of the axis 108. As illustrated in FIGS. 1-5, the flange 112 extends radially outward with respect to the axis 108 and with respect to the outer surface of the cylindrical body 110, such that the flange 112 has a larger cross-sectional shape when viewed along the axis 108 than the cylindrical body 110. In the illustrated embodiment, the flange 112 has a square cross-sectional shape when viewed along the axis 108, but in alternative embodiments, the flange can have other cross-sectional shapes, such as a circular, elliptical, triangular, rectangular, hexagonal, octagonal, or other shape.

As illustrated in FIGS. 1-5, the flange 112 of the base 102 includes a plurality of bore holes or through holes 114 that extend completely through the flange 112 from a first major surface thereof facing toward the cylindrical body 110 to a second major surface thereof facing away from the cylindrical body 110 along respective axes that are parallel to the axis 108. The through holes 114 can be configured to accept screws, bolts, nails, or other fasteners that may be used to couple the system 100 to a template, formwork for concrete, or another structure.

As also illustrated in FIGS. 1-5, the cylindrical body 110 of the base 102 has a depression, slot, or groove 116 formed in an end surface thereof facing away from the flange 112. The groove 116 extends in a direction transverse and perpendicular to the axis 108 through the end portion of the cylindrical body 110, from a first end 116a thereof to a second end 116b thereof opposite to the first end 116a. The groove 116 may be defined by a pair of sidewalls that extend parallel to one another and from the end surface of the cylindrical body 110 toward the flange 112, and parallel to the axis 108, and a base wall that extends from a first of the sidewalls to a second of the sidewalls and perpendicular to the axis 108. The cylindrical body 110 also includes a tooth, prong, protrusion, or ridge 118 that extends outward from the base wall of the groove 116 at the first end 116a of the groove 116, interrupting the groove 116 at the first end 116a of the groove 116. The ridge 118 has a first sidewall spaced apart from but proximate and parallel to the first sidewall defining the groove 116, a second sidewall spaced apart from but proximate and parallel to the second sidewall defining the groove 116, an end surface in a plane coincident with the end surface of the cylindrical body 110, an outer surface flush with the outer surface of the cylindrical body 110, and an inner surface perpendicular to its first and second side surfaces and its end surface.

As also illustrated in FIGS. 1-5, the base 102 includes a bore hole or a through hole 120 that extends through the entireties of both the cylindrical body 110 and the flange 112, along an axis parallel to the axis 108, and from the base wall of the groove 116 to an end surface of the flange 112 opposite to the cylindrical body 110. The through hole 120 may be configured to accept and retain a common wood-framing nail, such as a 16 penny nail 122. The through hole 120 is located proximate the second end 116b of the groove 116, and opposite to the ridge 118 across the cylindrical open space extending through the center of the base 102. Thus, when the base 102 is viewed in plan along the axis 108, a line extending through the centers of the ridge 118 and the through hole 120 may extend through the center of the cylindrical open space extending through the center of the base 102.

As also illustrated in FIGS. 1-5, the base 102 includes a pair of bore holes 124 that extend partially into the cylindrical body 110 along respective axes parallel to the axis 108, and from the end surface of the cylindrical body 110 opposite to the flange 112 toward the flange 112. The bore holes 124 may be threaded, and may be configured to accept and retain respective threaded screws or bolts 126 therein. A first one of the bore holes 124 may extend into the cylindrical body 110 from a location on a first side of the groove 116 and a second one of the bore holes 124 may extend into the cylindrical body 110 from a location on a second side of the groove 116 opposite to the first side across the groove 116, such that the bore holes 124 are opposite to one another across the cylindrical open space extending through the center of the base 102. Thus, when the base 102 is viewed in plan along the axis 108, a line extending through the centers of the bore holes 124 may extend through the center of the cylindrical open space extending through the center of the base 102 and perpendicular to the line extending through the centers of the ridge 118 and the through hole 120.

As illustrated in FIGS. 1-5, and in FIG. 5 in particular, the latch 106 has an outer periphery generally comprising a rectangular prism with curved ends. In particular, the latch has a thickness in a direction parallel to the axis 108, a length in a direction perpendicular to its thickness and aligned with a length of the groove 116 from the first end 116a thereof to the second end 116b thereof, and a width perpendicular to its thickness and its length. The latch 106 has a bottom or inner surface that is planar, that extends across its length and its width, and that is positioned flush against the base wall of the groove 116 when the system 100 is assembled, such that it moves or slides across the base wall of the groove 116 when the latch 106 is moved between an open position and a closed position. The latch 106 also has a top or outer surface that is planar, that extends across its length and its width, that is parallel to its inner surface, and that is positioned flush against an inner surface of the cap 104 when the system 100 is assembled, such that it moves or slides across the inner surface of the cap 104 when the latch 106 is moved between an open position and a closed position.

The latch 106 has a first sidewall that is planar, that extends across its length and its thickness, and that is positioned flush against the first sidewall of the groove 116 when the system 100 is assembled, such that it moves or slides across the first sidewall of the groove 116 when the latch 106 is moved between an open position and a closed position. The latch 106 also has a second sidewall that is planar, that extends across its length and its thickness, that is parallel to its first sidewall, and that is positioned flush against the second sidewall of the groove 116 when the system 100 is assembled, such that it moves or slides across the second sidewall of the groove 116 when the latch 106 is moved between an open position and a closed position. The latch 106 also has a first end wall that is slightly curved and that extends across its width and its thickness, as well as a second end wall that is slightly curved and that extends across its width and its thickness.

As illustrated in FIGS. 1-5, the latch 106 includes a large aperture or slot 128 that extends all the way from the bottom, inner surface, to the top, outer surface of the latch 106. The slot 128 has a first, inner sidewall that is spaced apart from, and extends parallel to, the first outer sidewall of the latch 106, a second, inner sidewall that is spaced apart from, and extends parallel to, the second outer sidewall of the latch 106, a first, inner end wall 130a that is spaced apart from the first outer end wall of the latch 106, and a second, inner end wall 130b that is spaced apart from the second outer end wall of the latch 106. As illustrated in FIGS. 1-5, the first, inner end wall 130a is slightly curved, and has a curvature configured to match or to mate with a curvature of the outer surface of the cylindrical body 110 of the base 102, such as with the outer surface of the ridge 118 thereof.

As also illustrated in FIGS. 1-5, the second, inner end wall 130b is curved, with a smaller radius of curvature than the first, inner end wall 130a, and has a curvature configured to match or to mate with a curvature of an outer surface of an anchor bolt to be cast into a solid concrete body. The second, inner end wall 130b is also threaded, with dimensions of the threads configured to match or to mate with threads of the anchor bolt. In some embodiments, the second, inner end wall 130b may have a radius of curvature of ¾ inch, or about ¾ inch, and threads in a thread density of 10 threads per inch, or may be configured to mate with an anchor both having a ¾ diameter and a thread density of 10 threads per inch. The threads may face toward the axis 108 and into the slot 128, such that the threads are configured to mate with an anchor bolt extending along the axis 108.

As also illustrated in FIGS. 1-5, the latch 106 includes a bore hole or a through hole 132 that extends through the entirety of the latch 106 along an axis parallel to the axis 108, and from the top, outer surface to the bottom, inner surface of the latch 106. The through hole 132 may be configured to accept and retain a common wood-framing nail, such as the 16 penny nail 122. The through hole 132 is aligned with the through hole 120 such that a central longitudinal axis of the through hole 132 is coincident with a central longitudinal axis of the through hole 120 and such that a single 16 penny nail 122 can extend simultaneously through both the through hole 120 and the through hole 132, such as to prevent the latch 106 from sliding or moving laterally with respect to the base 102.

FIGS. 1-5 also illustrate that the cap 104 comprises a hollow cylindrical body that surrounds a cylindrical open space at its center and that has a cylindrical outer surface, where the cylindrical open space and the cylindrical outer surface each have a respective central longitudinal axis coincident with the axis 108 such that the cap 104 is generally donut-shaped. The cap 104 has a bottom or inner surface that is planar and that is positioned flush against the end surface of the cylindrical body 110 and the outer surface of the latch 106 when the system 100 is assembled, such that the latch 106 moves or slides across the inner surface of the cap 104 when the latch 106 is moved between an open position and a closed position. The cap 104 also has a top or outer surface that is planar and that is parallel to its inner surface.

As also illustrated in FIGS. 1-5, the cap 104 includes a bore hole or a through hole 134 that extends through the entirety of the cap 104 along an axis parallel to the axis 108, and from the top, outer surface to the bottom, inner surface of the cap 104. The through hole 134 may be configured to accept and retain a common wood-framing nail, such as the 16 penny nail 122. The through hole 134 is aligned with the through hole 120 and the through hole 132 such that a central longitudinal axis of the through hole 134 is coincident with a central longitudinal axis of the through hole 120 and with a central longitudinal axis of the through hole 132, and such that a single 16 penny nail 122 can extend simultaneously through each of the through hole 120, the through hole 132, and the through hole 134, such as to prevent the latch 106 from sliding or moving laterally with respect to the cap 134 and the base 102.

As also illustrated in FIGS. 1-5, the cap 104 includes a pair of bore holes 136 that extend all the way through the cap 104 from the inner surface thereof to the outer surface thereof along respective axes parallel to the axis 108. The bore holes 136 may be threaded, and may be configured to accept and retain the threaded screws or bolts 126 therein. The bore holes 136 are located opposite to one another across the cylindrical open space extending through the center of the cap 104. When the cap 104 is viewed in plan along the axis 108, a line extending through the centers of the bore holes 136 may extend through the center of the cylindrical open space extending through the center of the cap 104 and be perpendicular to a line extending through the centers of the through hole 134 and the cylindrical open space extending through the center of the cap 104. The bore holes 136 are aligned with the bore holes 124 such that central longitudinal axes of the bore holes 136 are coincident with the respective central longitudinal axes of the bore holes 124 and such that individual screws or bolts 126 can extend simultaneously through one of the bore holes 124 and a respective one of the bore holes 136, such as to rigidly couple, fasten, or affix the cap 104 to the base 102.

In some embodiments, the components of the system 100, including the base 102, cap 104, and/or latch 106, may be formed from any of various suitable or desirable materials, such as ultra-high molecular weight polymers, polycarbonates, and/or metals such as aluminum. In some specific embodiments, the base 102 and the cap 104 are made from polycarbonate materials and the latch 106 is made from aluminum. In some embodiments, the components of the system 100, including the base 102, cap 104, and/or latch 106, may be formed by any known techniques, including machining, injection molding, and/or 3D printing.

FIGS. 1-5 also illustrate that the system 100 may include, or may be used in combination with, a nail 122. In some embodiments, the nail 122 may be a common, standard nail of any desired size, a framing nail, a finishing nail, a masonry nail, a roofing nail, a box nail, a brad nail, a drywall nail, or a flooring nail, may have a length of 1 inch or less, 2 inches, 3 inches, 4 inches, 5 inches, or 6 inches or more. As one specific example, the nail 122 may be a standard, common 16 penny nail having a length of 3½ inches. The through holes 120, 132, and 134 may have sizes and dimensions matching or corresponding to the size and dimensions of the nail 122, such that the nail 122 can slide easily and smoothly into and through the through holes 120, 132, and 134.

FIGS. 1-5 also illustrate that the system 100 may include, or may be used in combination with, screws or bolts 126. In some embodiments, such features may be a common, standard screw or bolt of any desired size, with any desired dimensions, of any desired material, and having any desired thread pattern. The bore holes 124 and 136 may have sizes and dimensions matching or corresponding to the size and dimensions of the screws or bolts 126, such that the screws or bolts 126 can thread easily into and out of the bore holes 124 and 136.

As illustrated in FIGS. 8-13, the system 100 can be coupled to an anchor bolt 138 to mount or secure the anchor bolt 138 in position as concrete is poured and cures around the anchor bolt 138. In some embodiments, the anchor bolt 138 is a standard bent anchor bolt having a diameter from ½ to 1¼ inch, length from 8 to 42 inches, leg length from 2 to 6 inches, and threads extending over the terminal 4 to 12 inches of the length, and may be made of stainless steel in any desired ASTM specification. In other embodiments, the anchor bolt 138 is a standard straight anchor rod having a diameter from ¾ to 2 inches, length from 8 to 60 inches, and threads extending over the entire length, or over the terminal 6 to 18 inches of the length at one end and 3 to eight inches at the opposite end such that a nut can be threaded thereon to be embedded in the concrete with the anchor rod, and may be made of stainless steel in any desired ASTM specification.

In other embodiments, the anchor bolt 138 is a standard headed anchor bolt having a diameter from ½ to 1 inch, length from 8 to 36 inches, and threads extending over the entire length, or over the terminal 6 to 18 inches of the length at one end and an integral hex head at the opposite end such that the hex head can be embedded in concrete with the rest of the anchor bolt 138, and may be made of stainless steel in any desired ASTM specification. In other embodiments, the anchor bolt 138 is a standard swaged anchor rod or swedged rod having any desired or standardized swedge pattern, a diameter from ¾ to 3 inches, length from 8 to 36 inches, and threads extending over the terminal 6 to 18 inches of the length at one end, and may be made of stainless steel in any desired ASTM specification.

A method of using the system 100 may include securing the base 102 to formwork or a rebar cage, or to other structure(s) associated with concrete construction, such as by fastening the flange 112 to such a structure using fasteners such as nails, screws, or bolts extending through the through holes 114. The method of using the system 100 may further include assembling the system 100. Assembling the system 100 may include starting with the base 102, cap 104, and latch 106 disassembled from one another, and then positioning the latch 106 on the base 102 as shown in the Figures and described above, such that the inner surface of the latch 106 is positioned flush against the base wall of the groove 116 and the side surfaces of the latch 106 are positioned flush against the sidewalls of the groove 116, with the ridge 118 extending through the slot 128. Assembling the system 100 may further include positioning the cap 104 on the base 102 and the latch 106 such that the inner surface of the cap 104 is positioned flush against the outer surface of the latch 106 and the end surface of the cylindrical body 110 of the base 102, and then threading the screws or bolts 126 through the bores holes 136 and into the bore holes 124 to secure the cap 104 to the base 102 with the latch 106 sandwiched and secured between base 102 and the cap 104 and locked to the base 102 and cap 104 by the ridge 118 extending through the slot 128.

The system 100 includes a main body having two separate and separable components, namely, the base 102 and the cap 104, which allows the single-piece latch 106 to be coupled to and/or removed from the main body as needed. In other embodiments, however, the system 100 may include a single-piece main body not having two separate and separable components, and may have a structure resembling the base 102 and cap 104 formed integrally with one another. In such an embodiment, the latch may be a two-piece latch that can be coupled to and/or removed from the single-piece main body in a manner similar to that described elsewhere herein for the system 100. For example, the two pieces of such a latch could be screwed together once positioned with the ridge 118 extending through the slot 128.

Once the system 100 has been assembled, the cap 104 is rigidly coupled and stationary with respect to the base 102, and the latch 106 can move or slide laterally back and forth through the groove 116, with movement or travel of the latch 106 through the groove 116 in a first direction toward an open position being limited by engagement of the first, inner end wall 130a of the slot 128 of the latch 106 with the outer surface of the ridge 118, and with movement or travel of the latch 106 through the groove 116 in a second direction toward a closed position being limited by engagement of the second, inner end wall 130b of the slot 128 of the latch 106 with the inner surface of the ridge 118. Such movement is illustrated in the difference between FIGS. 2 and 3, with FIG. 2 illustrating the latch 106 moved in the second direction to the closed position, and FIG. 3 illustrating the latch 106 moved in the first direction to the open position.

Figure 6:
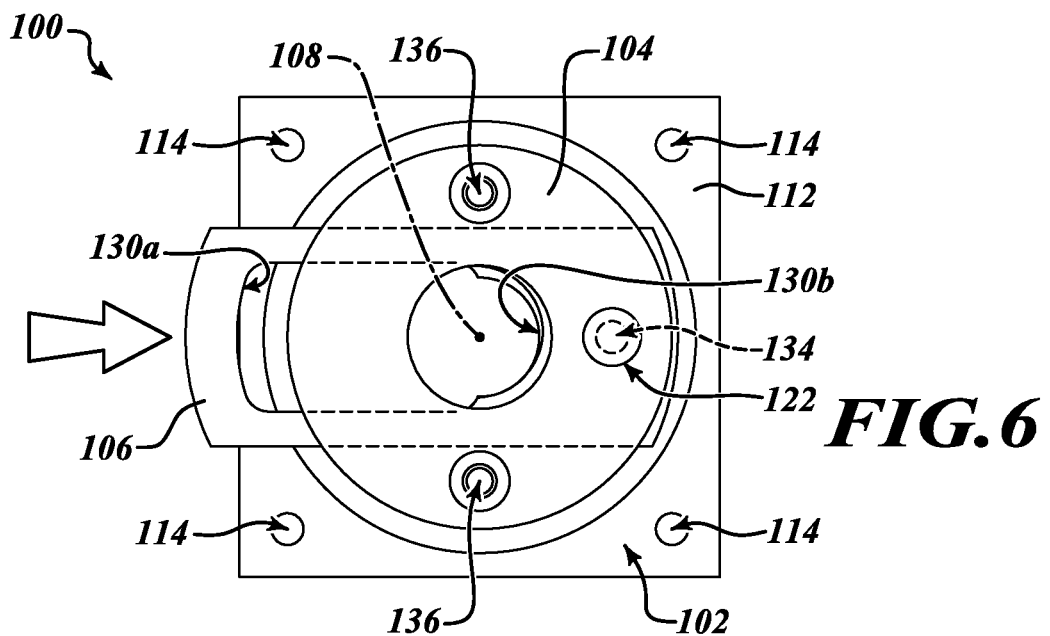
FIG. 6 is a plan view of the system for mounting an anchor bolt illustrated in FIG. 1, with some hidden features illustrated in phantom lines.
Figure 7:
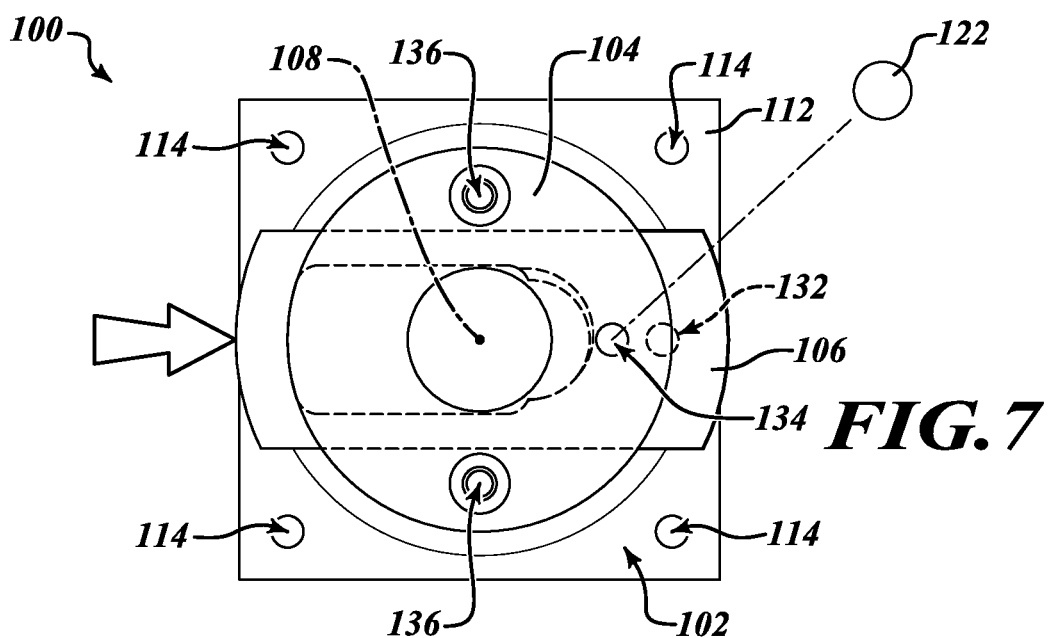
FIG. 7 is another plan view of the system for mounting an anchor bolt illustrated in FIG. 1, with some hidden features illustrated in phantom lines.

Such movement is also illustrated in the difference between FIGS. 6 and 7, with FIG. 6 illustrating the latch 106, shown partially in phantom lines where it would otherwise be hidden, moved in the second direction to the closed position, and FIG. 7 illustrating the latch 106, shown partially in phantom lines where it would otherwise be hidden, moved in the first direction to the open position. As illustrated in FIGS. 2, 4, and 6 in particular, when the latch 106 is in the closed position and the system 100 is viewed in plan along the axis 108, the threads formed in the second, inner end wall 130b of the latch 106 overlap with or otherwise correspond to the outer periphery of the cylindrical open spaces extending through the base 102 and the cap 104, such that the threads can engage complementary threads of the anchor bolt 138 when the anchor bolt 138 extends through such open spaces.

As shown in FIGS. 1-7, and in FIGS. 2 and 6 in particular, when the latch 106 is in the closed position, the through hole 134 is aligned with the through hole 120 and the through hole 132 such that a central longitudinal axis of the through hole 134 is coincident with a central longitudinal axis of the through hole 120 and with a central longitudinal axis of the through hole 132, and such that the nail 122 can extend simultaneously through each of the through hole 120, the through hole 132, and the through hole 134, such as to prevent the latch 106 from sliding or moving laterally with respect to the cap 134 and the base 102. As also shown in FIGS. 1-7, and in FIGS. 3 and 7 in particular, when the latch 106 is in the open position, the through hole 132 is not aligned with the through hole 120 and the through hole 134 such that a central longitudinal axis of the through hole 132 is not coincident with a central longitudinal axis of the through hole 120 or with a central longitudinal axis of the through hole 134, such that the nail 122 cannot extend simultaneously through each of the through hole 120, the through hole 132, and the through hole 134 to prevent the latch 106 from sliding or moving laterally with respect to the cap 134 and the base 102.

When the system 100 is initially assembled, the latch 106 is free to travel through the groove 116 between the open and closed positions. In some embodiments, the latch 106 may be spring loaded, such as with a spring that biases the latch toward the open or the closed position. The latch 106 may be moved to the closed position and the nail 122 may be inserted through the through holes 120, 132, and 134 to lock the latch in the closed position. The nail 122 may be removed from the through holes 120, 132, and 134 to unlock the latch 106 and allow the latch 106 to move from the closed position back to the open position. If not yet secured to another structure, the method of using the system 100 may then include securing the assembled system 100 to formwork or a rebar cage, or to other structure(s) associated with concrete construction, such as by fastening the flange 112 of the base 102 to such a structure using fasteners such as nails, screws, or bolts extending through the through holes 114.

The method of using the system 100 may further include moving the latch 106 to the open position, and moving an anchor rod 138 through the cylindrical open space extending through the center of the base 102, through the slot 128 in the latch 106, and through the cylindrical open space extending through the center of the cap 104, such that a central longitudinal axis of the anchor bolt 138 is coincident with the axis 108. Doing so may include only translating the anchor bolt 138 along the axis 108 without turning the anchor bolt 138 about the axis 108 or threading the anchor bolt 138 into the system 100. When the latch 106 is in the open position, there are no threads along the path traversed by the anchor bolt 138 through the system 100, to allow the anchor bolt 138 to move through the system 100 without threading into any other components.

Once the anchor bolt 138 extends through the system 100 in such a manner, movement or travel of the latch 106 through the groove 116 in the second direction toward the closed position is more limited by engagement of the second, inner end wall 130b of the slot 128 of the latch 106 with the outer surface of the anchor bolt 138. The method of using the system 100 may further include moving or sliding the latch 106 to the closed position, such that the second, inner end wall 130b of the slot 128 of the latch 106 is engaged with the outer surface of the anchor bolt 138, and such that the threads of the latch 106 are engaged with threads on the outer surface of the anchor bolt 138. Once the latch 106 is moved to the closed position in this manner, the engagement of the threads of the latch 106 with the threads of the anchor bolt 138 locks the anchor bolt 138 in place such that the anchor bolt 138 cannot translate linearly along the axis 108 with respect to the rest of the system 100. Once the anchor bolt 138 has been locked in place with respect to the rest of the system 100 in this manner, the nail 122 can be positioned within the through holes 120, 132, and 134, to lock the latch 106 in the closed position.

Once the anchor bolt 138 and the components of the system 100 have been locked in position in this manner, if not yet secured to another structure, the method of using the system 100 may then include securing the assembled system 100 and anchor bolt 138 to formwork or a rebar cage, or to other structure(s) associated with concrete construction, such as by fastening the flange 112 of the base 102 to such a structure using fasteners such as nails, screws, or bolts extending through the through holes 114. The method of using the system 100 may then include pouring concrete around a terminal end portion of the anchor bolt 138, such as the terminal end portion of the anchor bolt 138 that extends out of the flange 112 of the base 102. The process of pouring the concrete around the terminal end portion of the anchor bolt 138 typically generates forces tending to disturb the location and orientation of the anchor bolt 138. In some embodiments, however, the system 100 supports the anchor bolt 138 over greater than 1, greater than 1½, greater than 2, or about 2 inches of its length, such that such forces and associated bending moments can be adequately resisted and the position and orientation of the anchor bolt 138 can be maintained. The method may further include allowing the concrete to cure, thereby securing the anchor bolt 138 within the block of cured concrete.

Once the anchor bolt 138 has been secured within the block of cured concrete in this manner, the system 100 can be removed from the anchor bolt 138 and the block of cured concrete. For example, as illustrated in FIG. 8, removing the system 100 may include removing the nail 122 from the through holes 120, 132, and 134. As illustrated in FIG. 9, removing the system 100 may further include sliding the latch 106 with respect to the base 102 and cap 104 from the closed position to the open position. As illustrated in FIG. 10, removing the system 100 may further include moving, sliding, or translating the system 100 along the axis 108 with respect to the anchor bolt 138. Such moving of the system 100 along the axis 108 may include only translating the system 100 along the axis 108 with respect to the anchor bolt 138 without turning any components of the system 100 or the anchor bolt 138 about the axis 108 or threading the anchor bolt 138 out of the system 100.

Figure 11:
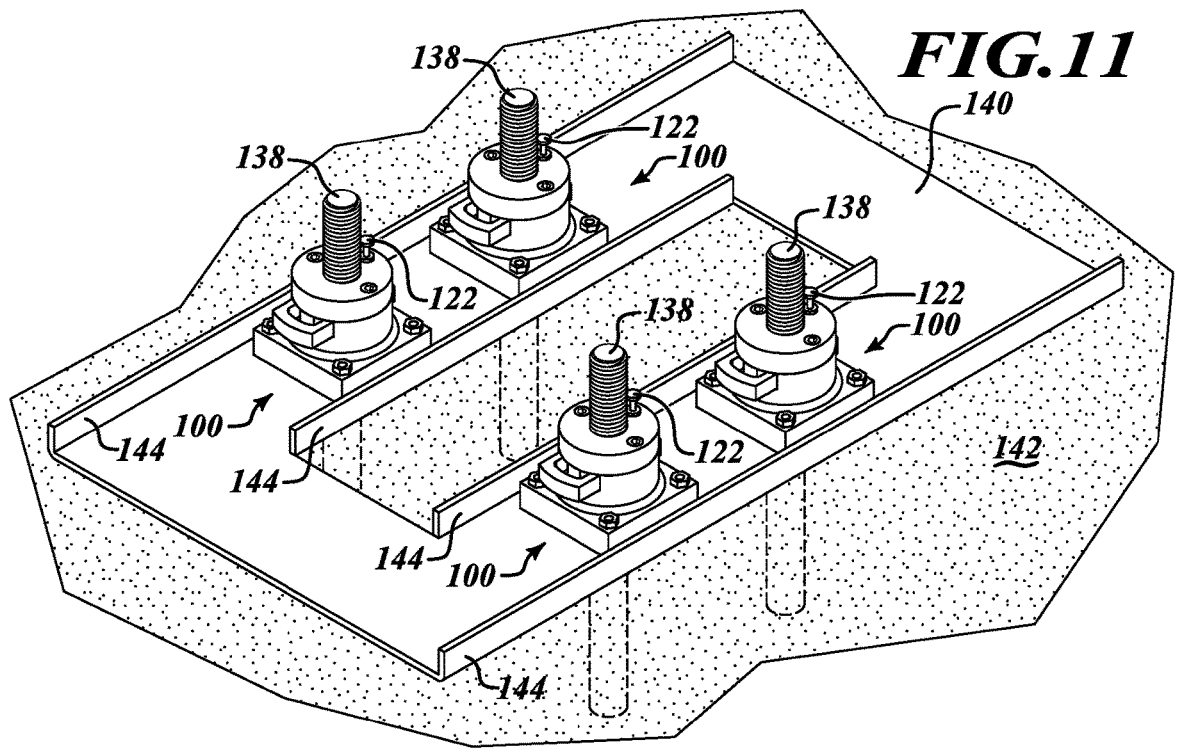
FIG. 11 is a perspective view of four of the system for mounting an anchor bolt illustrated in FIG. 1 coupled to a single support plate, with a respective anchor bolt coupled to each of the systems.
Figure 12:
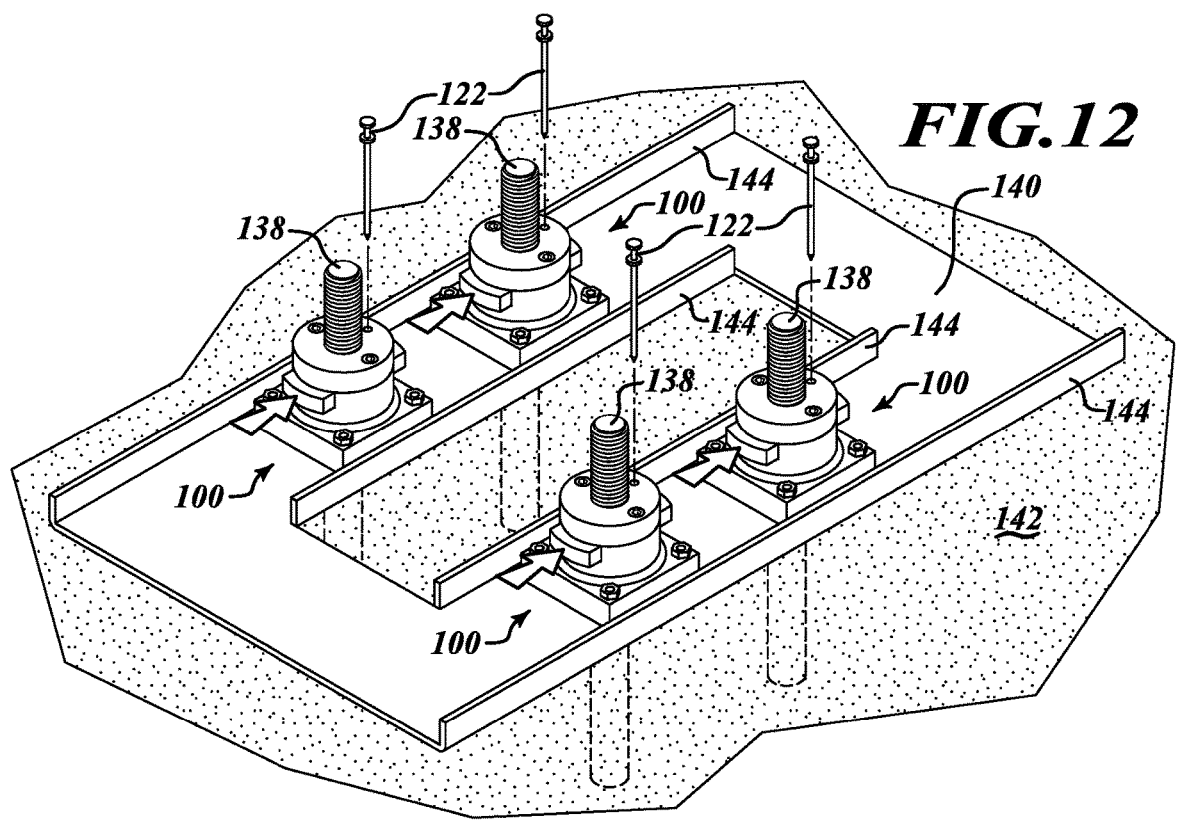
FIG. 12 is another perspective view of four of the system for mounting an anchor bolt illustrated in FIG. 1 coupled to a single support plate, with the respective anchor bolts released from each of the systems.
Figure 13:
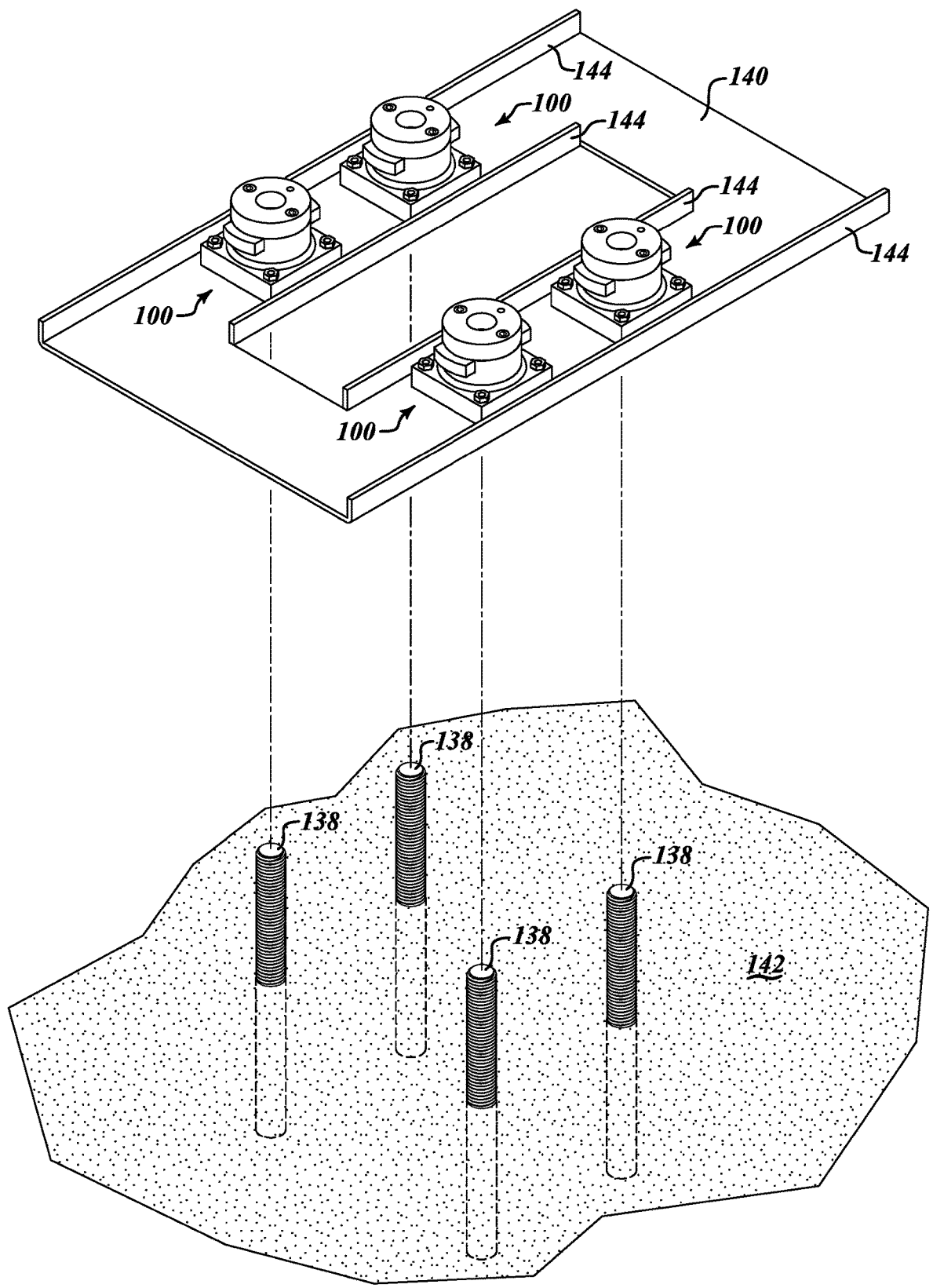
FIG. 13 is another perspective view of four of the system for mounting an anchor bolt illustrated in FIG. 1 coupled to a single support plate, with the respective anchor bolts embedded in a solid block of concrete and removed from each of the systems.

FIGS. 11-13 illustrates a guide plate 140, which may be referred to as a "template" 140, to which a plurality of systems 100 may be coupled for use in securing a respective plurality of anchor bolts 138 as a block of concrete 142 is poured around the anchor bolts 138. As illustrated in FIGS. 11-13, the template 140 has a generally planar main body and a plurality of flanges 144 standing upright with respect to the main body. The flanges may increase the overall rigidity of the template 140. The template 140 also includes a plurality of openings or apertures configured to align with the through holes 114 of the flanges 112 of the bases 102 of the systems 100, such that the systems 100 can be repeatedly, accurately and precisely coupled to the template 140 in a predictable and straightforward manner, such as with fasteners such as bolts or screws that extend through such apertures and the through holes 114. The template 140 also includes a plurality of openings or apertures configured to align with the cylindrical open spaces that extend through the bases 102 and the caps 104 of the systems 100, such that the anchor bolts 138 can be repeatedly, accurately and precisely coupled to and extend through the template 140 in a predictable and straightforward manner. The template 140 may be made of any suitable material, such as those described herein with respect to the base 102, cap 104, and/or latch 106, such as metal or plastic, or could also be made from wood.

To use the template 140 with the systems 100 and the anchor bolts 138, the components are coupled to one another in any suitable or desirable order. In some embodiments, the template 140 is first secured to formwork, a rebar cage, or other structure associated with concrete construction, the systems 100 are then secured to the template 140 using fasteners that extend through the through holes 114 and the apertures in the template 140, and the anchor bolts 138 are then secured to the systems 100 as described herein. In other embodiments, the template 140 is first secured to formwork, a rebar cage, or other structure associated with concrete construction, the anchor bolts 138 are then secured to the systems 100 as described herein, and the systems 100 and the anchor bolts 138 are then secured to the template 140 using fasteners that extend through the through holes 114 and the apertures in the template 140.

In other embodiments, the systems 100 are first secured to the template 140 using fasteners that extend through the through holes 114 and the apertures in the template 140, the template 140 and the systems 100 are then secured to formwork, a rebar cage, or other structure associated with concrete construction, and the anchor bolts 138 are then secured to the systems 100 as described herein. In other embodiments, the systems 100 are first secured to the template 140 using fasteners that extend through the through holes 114 and the apertures in the template 140, the anchor bolts 138 are then secured to the systems 100 as described herein, and the template 140, the systems 100, and the anchor bolts 138 are then secured to formwork, a rebar cage, or other structure associated with concrete construction.

In other embodiments, the anchor bolts 138 are first secured to the systems 100 as described herein, the template 140 is then secured to formwork, a rebar cage, or other structure associated with concrete construction, and the systems 100 and anchor bolts 138 are then secured to the template 140 using fasteners that extend through the through holes 114 and the apertures in the template 140. In other embodiments, the anchor bolts 138 are first secured to the systems 100 as described herein, the systems 100 and anchor bolts 138 are then secured to the template 140 using fasteners that extend through the through holes 114 and the apertures in the template 140, and the template 140, systems 100, and anchor bolts 138 are then secured to formwork, a rebar cage, or other structure associated with concrete construction.

In any case, once the components are secured to one another and the anchor bolts 138 are secured in position for concrete to be poured around the anchor bolts 138, the method may then include pouring concrete around terminal end portions of the anchor bolts 138, such as the terminal end portions of the anchor bolts 138 that extend out of the flanges 112 of the bases 102 and through the template 140. The process of pouring the concrete around the terminal end portions of the anchor bolts 138 typically generates forces tending to disturb the location and orientation of the anchor bolts 138. In some embodiments, however, the template 140 and systems 100 support the anchor bolts 138 such that such forces and associated bending moments can be adequately resisted and the position and orientation of the anchor bolts 138 can be maintained. The method may further include allowing the concrete to cure, thereby securing the anchor bolts 138 within the block of cured concrete 142.

Once the anchor bolts 138 have been secured within the block of cured concrete 142 in this manner, the template 140 and systems 100 can be removed from the anchor bolts 138 and the block of cured concrete 142. For example, as illustrated in FIG. 12, removing the template 140 and systems 100 may include removing the nails 122 from the through holes 120, 132, and 134 of the systems 100 and then sliding the latches 106 with respect to the bases 102 and caps 104 from their closed positions to their open positions. As illustrated in FIG. 13, removing the template 140 and systems 100 may further include moving, sliding, or translating the template 140 and systems 100 along the axes 108 with respect to the anchor bolts 138. Such moving of the template 140 and the systems 100 along the axes 108 may include only translating the template 140 and the systems 100 along the axes 108 with respect to the anchor bolts 138 without turning any components of the systems 100 or the anchor bolts 138 about the respective axes 108 or threading the anchor bolts 138 out of the systems 100.

The systems and methods described herein may be used in securing anchor bolts within concrete to be used in any application, with municipal or other infrastructure projects being one example. The anchor bolts described herein may be used to secure various other components, such as cable railings, support posts, power lines, lights, handrails, guardrails, wall sill plates, etc., to a concrete structure. The systems and methods described herein have various advantages over other systems for supporting anchor bolts while concrete is poured. For example, in the systems and methods described herein, no threading takes place between the anchor bolts 138 and any other components, such that assembly and disassembly are quicker and less labor-intensive. As another example, while the systems and methods described herein may typically be used to mount the anchor bolt(s) 138 in a vertical orientation and perpendicular to the template 140, the systems and methods described herein can be used to mount anchor bolt(s) 138 at any desired angle, such as upside down (180 degrees from vertical with respect to a direction of gravity) or greater than 0, 10, 20, 30, 40, 50, 60, 70, 80, 90, 100, 110, 120, 130, 140, 150, 160, or 170 degrees from vertical with respect to a direction of gravity, and/or less than 10, 20, 30, 40, 50, 60, 70, 80, 90, 100, 110, 120, 130, 140, 150, 160, 170, or 180 degrees from vertical with respect to a direction of gravity, and at any desired angle with respect to the template 140.

Furthermore, in the systems and methods described herein, only a single one of the systems 100 is needed to mount a single anchor bolt 138, and only a single template 140 is needed to mount any number of anchor bolts. This stands in contrast to prior systems, which often use a second template or other component to hold the anchor bolt(s) at their embedded ends to improve resistance to bending moments generated as concrete is poured and flows around the anchor bolt(s). In such prior systems, such second templates or other components are often sacrificial or consumable, in that they end up embedded in the cured concrete block along with the terminal end portions of the anchor bolt(s). In contrast, the systems described herein are entirely non-consumable and re-usable.

Figure 14:
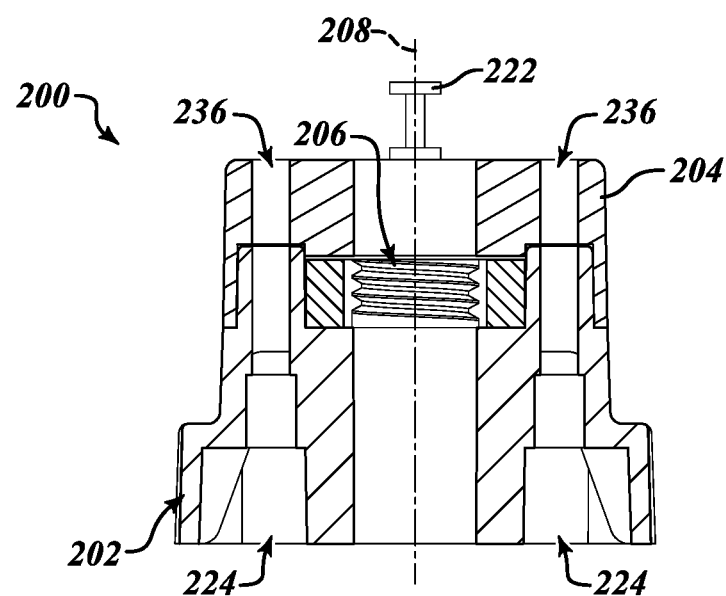
FIG. 14 is a cross-sectional view of another system for mounting an anchor bolt.
Figure 15:
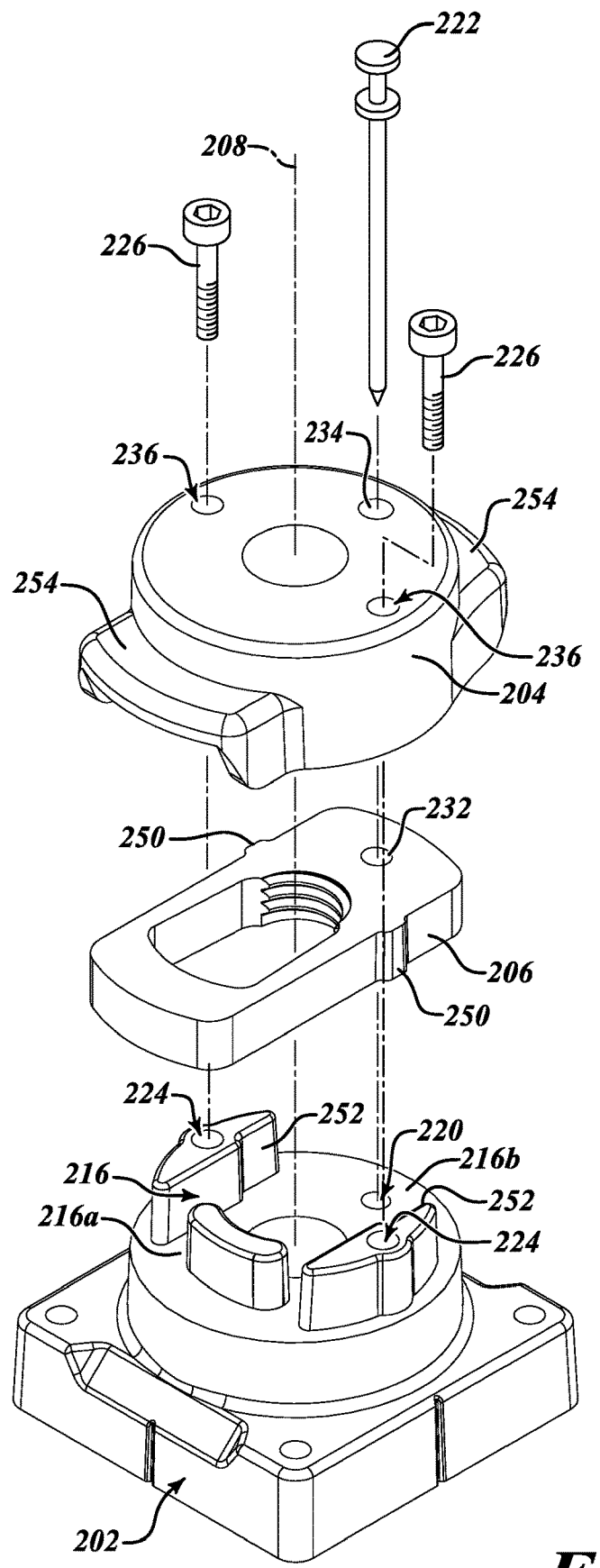
FIG. 15 is an exploded view of the system for mounting an anchor bolt illustrated in FIG. 14.
Figure 16:
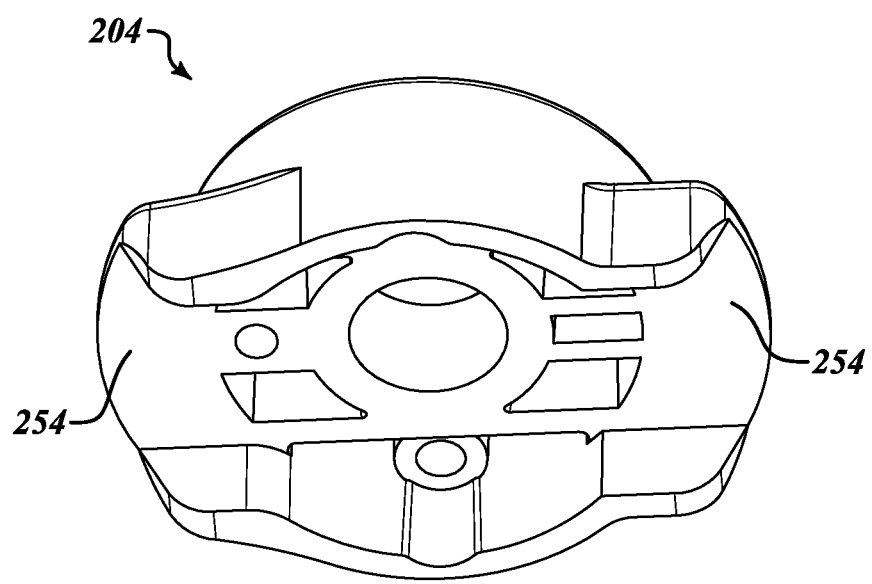
FIG. 16 is a perspective view of a component of the system for mounting an anchor bolt illustrated in FIG. 14.

FIGS. 14-16 illustrate components and features of another system 200 for mounting or securing an anchor bolt in place as concrete is poured around the anchor bolt and allowed to cure. As illustrated in FIGS. 14-16, the system 200 includes many of the same features as the system 100, and unless described or illustrated otherwise herein, or otherwise clear from the context, the system 200 includes the features of the system 100 and can be used in the same ways and methods as the system 100. Similarly, unless described or illustrated otherwise herein, or otherwise clear from the context, the system 100 can include features of the system 200 and can be used in the same ways and methods as the system 200. As illustrated in FIGS. 14-16, the system 200 includes a base 202 corresponding to the base 102, a cap 204 corresponding to the cap 104, a latch 206 corresponding to the latch 106, and has a central longitudinal axis 208 corresponding to the axis 108.

As further illustrated in FIGS. 14-16, the base 202 has a groove 216 corresponding to the groove 116 formed in an end surface thereof. The groove 216 extends in a direction perpendicular to the axis 208 from a first end 216*a* thereof to a second end 216*b* thereof. The base 202 also includes a through hole 220 corresponding to the through hole 120 that is configured to accept and retain a nail 222 corresponding to the nail 122. The latch 206 includes a through hole 232 corresponding to the through hole 132 and the cap 204 includes a through hole 234 corresponding to the through hole 134. The base 202 also includes a pair of bore holes 224 corresponding to the bore holes 124 configured to accept and retain respective bolts 226 corresponding to the bolts 126, and the cap 204 includes a pair of bore holes 236 corresponding to the bore holes 136.

FIG. 14 illustrates that the bore holes 224 extend all the way through the base 202 from a first end thereof engaged with the cap 204 to a second end thereof opposite the first end thereof. FIG. 14 also illustrates that the bore holes 224 each have a relatively narrow portion thereof proximate an end of the base 202 engaged with the cap 204, and a relatively wide portion thereof distal to the end of the base 202 engaged with the cap 204. In some embodiments, a metallic threaded nut or other metallic threaded retainer or retaining component can be seated within the relatively wide portions of the bore holes 224, and the bolts 226 can extend through the bore holes 236, through the relatively narrow portions of the bore holes 224, and thread into the metallic threaded nuts. Such features can provide a stronger anchor for the bolts 226 than if they are threaded into the base 202 itself, which may be made of plastic, and therefore can strengthen the connection between the base 202 and the cap 204.

FIG. 15 illustrates that the latch 206 includes a pair of arms 250 that extend outward from the side surfaces of the latch 206 and with respect to one another. A first one of the arms 250 extends outward from the first side surface of the latch 206 and a second one of the arms 250 extends in an opposite direction outward from the second side surface of the latch 206. FIG. 15 also illustrates that the base 202 includes a pair of recesses 252 formed in the side walls that define the lateral extents of the groove 216 at end portions thereof proximate the through hole 220. A first one of the recesses 252 faces inward toward the groove 216 and toward the first side surface of the latch 206 and a second one of the recesses 252 faces inward toward the groove 216 and in an opposite direction toward the second side surface of the latch 206. When the system 200 is in use, travel of the latch 206 through the groove 216 can be limited by engagement of the arms 250 with terminal end portions of the recesses 252, that is, when the arms 250 are seated within the recesses 252.

FIGS. 15 and 16 illustrate that the cap 204 includes a pair of arms 254 that extend outward from side surfaces of the cap 204 and with respect to one another. A first one of the arms 254 extends outward from a first side surface of the cap 204 in a direction aligned with an axis extending from the through hole 234 toward the cylindrical open space extending through the cap 204, and a second one of the arms 254 extends in an opposite direction outward from a second side surface of the cap 204 opposite the first side surface of the cap 204 in a direction aligned with an axis extending from the cylindrical open space extending through the cap 204 toward the through hole 234. As illustrated in FIGS. 15 and 16, each of the arms 254 has a generally C-shaped profile that faces toward the base 202 and the latch 206. Thus, when the system 200 is in use, the arms 254 can cover and surround end portions of the latch 206, thereby protecting the end portions of the latch 206 from contact with concrete or other debris.

In some implementations, the through holes 220, 232, and 234 have an elliptical shape or profile when viewed in plan or in a direction aligned with the axis 208. In such embodiments, the elliptical shape of the through holes 220, 232, and 234 can more closely and snugly fit the outer profile of the nail 222, as many standard nails have elliptical outer cross-sectional shapes as a result of their manufacturing processes. The system 200 can be configured to work with anchor bolts of any desired dimensions, with 0.625 (⅝) inch and 0.75 (¾) inch diameter anchor bolts being two specific examples. In some implementations, the latch 206 may be manufactured or fabricated by injection molding a hard grade polymer, rather than by machining. In some implementations, the latch 206 may be made of aluminum.

U.S. provisional patent application No. 62/950,059, filed Dec. 18, 2019, is hereby incorporated herein in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for mounting an anchor bolt to formwork or other structures associated with concrete construction, comprising:
  a main body including an open space that extends through the main body, wherein the open space has a central longitudinal axis and is configured to receive the anchor bolt, wherein the main body includes a slot that extends through the main body in a direction transverse to the axis; and
  a latch positioned within the slot, wherein the latch has a wall that is curved with a radius of curvature corresponding to a radius of the anchor bolt and that has first threads with first thread dimensions corresponding to second thread dimensions of second threads of the anchor bolt, wherein the latch can translate through the slot between a closed position and an open position, wherein when the anchor bolt extends through the open space and the latch is translated through the slot to the closed position, the first threads of the latch engage the second threads of the anchor bolt to prevent translation of the anchor bolt along the axis with respect to the main body and when the anchor bolt extends through the open space and the latch is translated through the slot to the open position, the first threads of the latch do not engage the second threads of the anchor bolt.

2. The system of claim 1 wherein the main body includes a flange that extends radially outward with respect to the axis.

3. The system of claim 2 wherein the main body includes a plurality of through holes that each extend through the flange and parallel to the axis.

4. The system of claim 1 wherein the slot extends perpendicular to the axis.

5. The system of claim 1 wherein the main body has a first through hole that extends through the main body and the latch has a second through hole that extends through the latch, wherein the first through hole is aligned with the second through hole when the latch is in the closed position.

6. The system of claim 5 wherein the first and second through hole are configured to receive a 16 penny nail.

7. The system of claim 1 wherein the slot is a first slot, the main body includes a ridge that extends through the first slot, the latch includes a second slot, and the ridge extends through the second slot.

8. The system of claim 7 wherein the ridge limits travel of the latch through the first slot.

9. The system of claim 7 wherein the first threads are formed in the second slot.

10. The system of claim 1 wherein the main body includes a base and a cap, wherein the cap can be fastened to the base to lock the latch to the main body and the cap can be unfastened from the base to unlock the latch from the main body.

11. The system of claim 1 wherein the latch includes a first portion and a second portion, wherein the first portion can be fastened to the second portion to lock the latch to the main body and the first portion can be unfastened from the second portion to unlock the latch from the main body.

12. A method, comprising:
  securing a template to concrete formwork;
  securing a mounting system to the template, wherein the mounting system includes a main body and a latch, the main body having an open space and a slot extending through the main body;
  translating an anchor bolt through the open space extending through the main body; and
  translating the latch through the slot extending through the main body until a first curved, threaded wall of the latch engages a second curved, threaded wall of the anchor bolt such that the latch prevents translation of the anchor bolt through the open space.

13. The method of claim 12, further comprising:
  pouring concrete around a portion of the anchor bolt and allowing the concrete to cure;
  translating the latch through the slot extending through the main body until the first curved, threaded wall of the latch does not engage the second curved, threaded wall of the anchor bolt; and
  translating the template and the mounting system with respect to the anchor bolt until the anchor bolt does not extend through the open space extending through the main body.

14. The method of claim 12 wherein the mounting system is a first mounting system, the main body is a first main body, the latch is a first latch, the open space is a first open space, the slot is a first slot, and the method further comprises:

securing a second mounting system to the template, wherein the second mounting system includes a second main body and a second latch, the second main body having a second open space and a second slot extending through the second main body;

securing a third mounting system to the template, wherein the third mounting system includes a third main body and a third latch, the third main body having a third open space and a third slot extending through the third main body; and securing a fourth mounting system to the template, wherein the fourth mounting system includes a fourth main body and a fourth latch, the fourth main body having a fourth open space and a fourth slot extending through the fourth main body.

15. The method of claim 12 wherein securing the template to the concrete formwork occurs before securing the mounting system to the template.

16. The method of claim 12 wherein securing the mounting system to the template occurs before securing the template to the concrete formwork.

17. The method of claim 12 wherein securing the template to the concrete formwork occurs before translating the anchor bolt through the open space and the latch through the slot.

18. The method of claim 12 wherein translating the anchor bolt through the open space and the latch through the slot occurs before securing the template to the concrete formwork.

19. The method of claim 12 wherein securing the mounting system to the template occurs before translating the anchor bolt through the open space and the latch through the slot.

20. The method of claim 12 wherein translating the anchor bolt through the open space and the latch through the slot occurs before securing the mounting system to the template.

\* \* \* \* \*